United States Patent [19]

Ruhs et al.

[11] 4,337,239
[45] Jun. 29, 1982

[54] PROCESS FOR THE PRODUCTION OF TITANIUM DISULFIDE OF HIGH PURITY AND STOICHIOMETRIC COMPOSITION

[75] Inventors: Alexander Ruhs, Rheinfelden; Rudolf Schwarz, Alzenau-Wasserlos; Peter Kleinschmit, Hanau, all of Fed. Rep. of Germany

[73] Assignee: Degussa Aktiengesellschaft, Frankfurt, Fed. Rep. of Germany

[21] Appl. No.: 205,505

[22] Filed: Nov. 10, 1980

[30] Foreign Application Priority Data

Nov. 9, 1979 [DE] Fed. Rep. of Germany ....... 2945306

[51] Int. Cl.$^3$ .................. C01B 7/01; C01B 17/20; C01G 23/00
[52] U.S. Cl. .................. 423/561 R; 423/481; 422/210
[58] Field of Search .................. 423/561 R, 565, 481; 422/210

[56] References Cited

U.S. PATENT DOCUMENTS 3,979,500  9/1976  Sheppard et al. ............... 423/561 R
3,980,761  9/1976  Thompson et al. ............... 423/565
4,007,055  2/1977  Whittingham .................. 423/565
4,137,297  1/1979  Thorp et al. ................. 423/561 R
4,259,310  3/1981  Clapper ...................... 423/565

FOREIGN PATENT DOCUMENTS 2807388 11/1979 Fed. Rep. of Germany ... 423/561 R
1558050  3/1968 France ..................... 423/561 R
 630042 10/1949 United Kingdom ............ 423/561 R
 878101  9/1961 United Kingdom ............ 423/561 R
1033584  6/1966 United Kingdom ............ 423/561 R Primary Examiner—Gary P. Straub
Attorney, Agent, or Firm—Cushman, Darby & Cushman

[57] ABSTRACT

There is required titanium disulfide of high purity and stoichiometric composition as electrode material for certain types of batteries. With the known process for reacting preheated gaseous titanium tetrachloride with an excess of preheated gaseous hydrogen sulfide at 400° to 600° C., there is obtained a product which is not optimally usable. A titanium disulfide quality of higher purity and stoichiometry is obtained by forcing a deposition of the titanium disulfide on the inner walls of the reactor through regulating the temperature at the reactor walls and/or the residence time of the gaseous mixture. The titanium disulfide can be mechanically stripped off the walls and removed countercurrently to the waste gas stream from the reactor.

9 Claims, No Drawings

PROCESS FOR THE PRODUCTION OF TITANIUM DISULFIDE OF HIGH PURITY AND STOICHIOMETRIC COMPOSITION

BACKGROUND OF THE INVENTION

The invention is directed to a process for the production of titanium disulfide of high purity and stoichiometrical composition by reacting preheated titanium tetrachloride with an excess of preheated hydrogen sulfide in a preheated reactor at temperatures between 400° and 600° C.

Titanium disulfide of the highest possible purity and stoichiometric composition has recently been used as electrode material for certain types of batteries. Titanium disulfide has many properties which make it attractive as active cathode material in secondary elements. The high mobilities of foreign ions and foreign molecules in the titanium disulfide lattice necessary for this purpose, however, in high measure are dependent upon its crystalline perfection, i.e., on the absence of impurities and a composition which corresponds to the theoretical stoichiometric value.

In the previously known process for the production of titanium disulfide (e.g. German OS No. 26 52 908, Austrian application No. 1596/68, and German AS No. 1224288), there are obtained products which either are not employable or not optimally employable as electrode materials for batteries since they still contain impurities and the composition also does not correspond exactly to the stoichiometric value.

In Thorp U.S. Pat. No. 4,137,297, there is described a process for the production of titanium disulfide in which a dry, oxygen free gaseous mixture of titanium tetrachloride and excess hydrogen sulfide are reacted at 460°–570° C. in a reaction container. The two reaction components thereby were preheated likewise to 460°–570° C. The gaseous mixture flows through the reaction zone of the reactor with such speed that the titanium disulfide particles formed are carried along in the gas stream and are not separated from the waste gases until outside the reaction zone, so that no crusts of titanium disulfide are able to deposit on the reactor walls. To avoid such titanium disulfide deposits, the temperature of the reactor walls besides should not be more than 100° C., preferably not more than 50° C. higher than the temperature in the reaction zone.

The product obtained by this process, however, in spite of a thermal post treatment at 130° to 200° C. still contains impurities and the other properties also are not sufficient for optimal use as electrode material for batteries.

Therefore, it was the problem of the present invention to develop a process for the production of titanium disulfide of higher purity and stoichiometric composition by reaction of preheated gaseous titanium tetrachloride with an excess of preheated gaseous hydrogen sulfide in a heated reactor at a temperature of 400° to 600° C. which is optimally usable as electrode material in batteries.

SUMMARY OF THE INVENTION

This problem was solved according to the invention by regulating the temperature of the reactor walls and/or the residence time of the gaseous mixture to force a deposition of the titanium disulfide formed on the inner walls of the reaction and mechanically stripping the titanium disulfide off the walls and removing it countercurrently to the waste gas stream.

It has surprisingly been discovered that by the forced deposition of the titanium disulfide formed on the inner walls of the reactor, which in all previously known process under all circumstances was sought to be prevented, there is formed a product which after mechanical stripping and removal from the reactor countercurrently to the waste gas stream has a high purity, a stoichiometric composition, and a crystalline structure to such an extent that it is optimally usable as material for electrodes in batteries.

The production of the titanium disulfide takes place by introduction of gaseous titanium tetrachloride and gaseous hydrogen sulfide into a heated reactor with the exclusion of oxidizing gases and moisture. As the reactor there can be employed for example a vertical tube whose inner surface can be cleaned with the help of a mechanical stripper. The reaction temperature in the gas space is 400° to 600° C., preferably 500° to 550° C., whereby the temperature of the reactor walls advantageously is at least 50° C. higher than the temperature of the reactants. Instead of employing an increased reactor wall temperature the desired and, for the product of the invention, necessary deposition of the titanium disulfide on the inner walls of the reactor can also be forced by establishing a relatively small gaseous reaction gas speed and therewith an increase in the residence time of the reaction gas mixture in the reaction zone. The most favorable parameter for this is easily ascertained for the particular reactor. Thus, for example, at a length of the reactor of 100 cm, a reactor diameter of 12 cm, a reaction wall temperature of 550° C., there is an hourly introduction of 500 grams of $TiCl_4$, an insertion ratio $TiCl_4:H_2S=1:2.3$, a temperature of the reactants of 500° C., the amount of 500 grams of $TiCl_4$ reacts with nearly complete deposition of the titanium disulfide formed on the inner walls of the reactor.

The reactants titanium tetrachloride and hydrogen sulfide previously preheated to a temperature of preferably 350°–450° C. are supplied through separate openings, advantageously in the lower third of the reactor whereby the molar ratio of $TiCl_4:H_2S$ employed is between 1:2.1 and 1:4. The use of nitrogen as carrier gas is indeed not absolutely necessary. In any case, however, its use is advantageous, particularly with very small flow velocities of the reactants.

For example, the small velocity of the reaction gas mixture can range from 0.1 to 10 meters/min.

The titanium disulfide formed deposits under the reaction conditions of the invention in the form of agglomerates on the inner wall of the reactor and is preferably conveyed periodically by a mechanical stripper to the discharge opening at the lower end of the reactor. The waste gases of hydrogen chloride, unreacted titanium tetrachloride and hydrogen sulfide leave the reaction vessel at the upper end whereby the finely divided $TiS_2$ which is carried along in some cases is retained by a filter.

The inlet opening in the reactor for the titanium tetrachloride advantageously is above the inlet opening for the hydrogen sulfide through which in discharging the titanium disulfide there is formed a post treatment zone, which zone predominantly consists of hydrogen sulfide. Through this the traces of titanium tetrachloride which are absorbed in some cases as well as lower titanium sulfide are removed.

The product mechanically stripped from the inner walls of the reactor then passes into a receiver and is preferably cooled in a stream of nitrogen.

There is obtained by the process of the invention a roentgenographically pure titanium disulfide of a very high degree of purity which suffices optimally to be employed as electrode material in batteries. A more homogeneous particle distribution and therewith still better properties as electrode material is obtained by mechanically grinding the titanium disulfide preferably in a pin mill.

The yield is 90% or higher in reference to the titanium tetrachloride employed.

The process can comprise, consist essentially of or consist of the stated steps with the materials set forth.

Unless otherwise indicated, all parts and percentages are by weight.

The following example illustrates the invention in more detail.

DETAILED DESCRIPTION

EXAMPLE

A vertical tubular reactor (inner diameter 12 cm, height 100 cm) was heated from the outside of 550° C. The reactor was supplied through a side inlet opening at a height of about 30 cm hourly with 820 grams of $TiCl_4$ vapor at 400° C. Likewise, the feeding of hydrogen sulfide heated to 400° C. took place from the side at the lower end of the reactor. The molar input ratio $H_2S:TiCl_4$ was 2.3:1.

The reaction waste gases predominantly consisting of hydrogen chloride left the reaction vessel at the upper end, unreacted $TiCl_4$ can be recovered in a post connected condenser.

The $TiS_2$ formed was periodically conveyed from below into a receiver by a mechanical stripper and cooled in a stream of nitrogen. There were obtained hourly 442 grams of the product as lustrous green leaves, corresponding to a yield of 91.4% (based on the $TiCl_4$). According to chemical and X-ray analysis, the product was pure $TiS_2$. The content of chlorine, respectively free sulfur was less than 0.4, respectively 0.2%.

The entire disclosure of German priority application No. P 2945306.3 is hereby incorporated by reference.

What is claimed is:

1. In a process for the production of titanium disulfide of high purity and stoichiometric composition by reacting preheated gaseous titanium tetrachloride with an excess of preheated gaseous hydrogen sulfide in a heated vertical reactor at a temperature of 400° to 600° C., the improvement comprising introducing the titanium tetrachloride and hydrogen sulfide into the lower third of the reactor, regulating the temperature on the reactor wall and/or the residence time of the gaseous mixture in the reactor to force a nearly complete deposition of the titanium disulfide formed on the inner wall of the reactor, mechanically stripping the deposited titanium disulfide from the reactor inner wall and removing the titanium disulfide from the lower end of the reactor in countercurrent flow to the waste gas stream, said waste gas stream leaving the reactor at the upper end thereof.

2. The process of claim 1, wherein the temperature on the reactor walls is regulated to form a deposition of the titanium disulfide on the inner wall of the reactor.

3. The process of claim 2 wherein the temperature of the reactor wall is at least 50° C. higher than the temperature of the reactants.

4. The process of claim 3 wherein the titanium disulfide formed on the reactor walls is periodically stripped therefrom.

5. The process of claim 3 wherein the titanium tetrachloride and the hydrogen sulfide are preheated to 350° to 450° C. before being introduced to the reactor.

6. The process of claim 1 wherein the temperature of the reactor wall is at least 50° C. higher than the temperature of the reactants, the titanium disulfide formed on the reactor walls is periodically stripped therefrom, the titanium tetrachloride and the hydrogen sulfide are preheated to 350° to 450° C. before being introduced to the reactor and the molar ratio of of titanium tetrachloride to hydrogen sulfide is between 1:2.1 and 1:4 and the reactor is a tube.

7. The process of claim 6 wherein the velocity of the gaseous mixture is from 0.1 to 10 meters/min.

8. The process of claim 1 wherein the velocity of the gaseous mixture is from 0.1 to 10 meters/min.

9. The process of claim 1 wherein the sole materials fed to the reactor are either (1) gaseous titanium tetrachloride and gaseous hydrogen sulfide or (2) gaseous titanium tetrachloride, gaseous hydrogen sulfide and a carrier gas.

* * * * *